United States Patent
Jozaki et al.

(10) Patent No.: US 12,512,711 B2
(45) Date of Patent: Dec. 30, 2025

(54) ROTOR WITH MAGNET AND EMBEDDING HOLES

(71) Applicants: TOYOTA JIDOSHA KABUSHIKI KAISHA, Toyota (JP); AISIN CORPORATION, Kariya (JP)

(72) Inventors: Ken Jozaki, Toyota (JP); Toshinori Okochi, Toyota (JP); Yoshizumi Kitahara, Toyota (JP); Takahiro Odagi, Kariya (JP); Masayuki Ikemoto, Kariya (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 219 days.

(21) Appl. No.: 18/277,154

(22) PCT Filed: Feb. 15, 2022

(86) PCT No.: PCT/JP2022/005829
§ 371 (c)(1),
(2) Date: Aug. 14, 2023

(87) PCT Pub. No.: WO2022/176829
PCT Pub. Date: Aug. 25, 2022

(65) Prior Publication Data
US 2024/0136871 A1    Apr. 25, 2024
US 2024/0235290 A9    Jul. 11, 2024

(30) Foreign Application Priority Data

Feb. 16, 2021 (JP) .................. 2021-022727

(51) Int. Cl.
*H02K 1/276* (2022.01)
*H02K 29/03* (2006.01)

(52) U.S. Cl.
CPC ............. *H02K 1/276* (2013.01); *H02K 29/03* (2013.01)

(58) Field of Classification Search
CPC ........ H02K 1/27; H02K 1/276; H02K 1/2766; H02K 9/03; H02K 15/024
(Continued)

(56) References Cited

U.S. PATENT DOCUMENTS 6,034,459 A * 3/2000 Matsunobu ............. B60L 15/20
                                                    310/156.53
6,133,662 A * 10/2000 Matsunobu ............. H02K 1/278
                                                    310/156.53
(Continued)

FOREIGN PATENT DOCUMENTS

EP        1942572 A1    7/2008
JP     2007-097387 A    4/2007
(Continued)

*Primary Examiner* — Maged M Almawri
(74) *Attorney, Agent, or Firm* — Sughrue Mion, PLLC

(57) ABSTRACT

A rotor used for a motor includes a rotor core, and a plurality of permanent magnets embedded in a corresponding plurality of embedding holes in the rotor core configured to include flux barriers at both ends of the plurality of embedding holes in the rotor core and to include a plurality of magnetic poles. The rotor core includes a plurality of grooves on an outer peripheral surface, the plurality of grooves, with the two paired grooves, are away from an axis that becomes the q-axis when the motor is operated, and are arranged symmetrically about the axis, and the rotor core has such a cross-section that a first angle between two lines passing through the two grooves and the center of the rotor core is smaller than a second angle between the axis-side end face of the two flux barriers adjacent to each other across the axis.

6 Claims, 4 Drawing Sheets

(58) Field of Classification Search
USPC .................. 310/156.53, 156.56, 156.57
See application file for complete search history.

(56) References Cited

U.S. PATENT DOCUMENTS

| | | | | |
|---|---|---|---|---|
| 6,525,442 | B2* | 2/2003 | Koharagi | H02K 1/2766 310/156.56 |
| 6,867,526 | B2* | 3/2005 | Mori | H02K 1/2766 310/156.57 |
| 7,119,507 | B2* | 10/2006 | Nishijima | H02K 1/276 318/632 |
| 7,605,510 | B2* | 10/2009 | Okuma | H02K 1/2766 310/156.56 |
| 7,612,480 | B2* | 11/2009 | Fujii | H02K 1/2766 310/156.56 |
| 8,405,270 | B2* | 3/2013 | Li | H02K 1/276 310/156.53 |
| 8,659,200 | B2* | 2/2014 | Adaniya | H02K 21/16 310/156.57 |
| 9,077,224 | B2* | 7/2015 | Morishita | H02K 1/2766 |
| 9,893,580 | B2* | 2/2018 | Soma | H02K 1/276 |
| 9,985,484 | B2* | 5/2018 | Liang | H02K 1/2766 |
| 10,003,228 | B2* | 6/2018 | Lipo | H02K 1/276 |
| 2001/0028201 | A1* | 10/2001 | Miyashita | H02K 1/276 310/254.1 |
| 2002/0047432 | A1* | 4/2002 | Miyashita | H02K 21/14 310/156.48 |
| 2003/0178905 | A1* | 9/2003 | Koharagi | H02K 1/2766 310/156.38 |
| 2006/0131976 | A1* | 6/2006 | Kikuchi | H02K 1/276 310/156.46 |
| 2007/0085436 | A1* | 4/2007 | Tajima | B60L 50/66 310/156.53 |
| 2007/0200447 | A1* | 8/2007 | Adaniya | H02K 29/03 310/156.53 |
| 2008/0018190 | A1* | 1/2008 | Takahata | H02K 1/276 310/156.55 |
| 2009/0230802 | A1* | 9/2009 | Kamiya | B60L 15/2009 903/906 |
| 2009/0261679 | A1* | 10/2009 | Sakai | H02K 29/03 310/156.53 |
| 2010/0181864 | A1* | 7/2010 | Miura | H02K 1/2766 310/216.094 |
| 2010/0213780 | A1* | 8/2010 | Lee | H02K 1/2766 310/156.53 |
| 2011/0133590 | A1* | 6/2011 | Lokhandwalla | H02K 1/2766 310/156.53 |
| 2012/0139378 | A1* | 6/2012 | Endo | H02K 15/03 29/598 |
| 2012/0139386 | A1* | 6/2012 | Murakami | H02K 29/03 310/216.092 |
| 2013/0270958 | A1* | 10/2013 | Takahashi | H02K 1/274 310/156.38 |
| 2014/0217849 | A1* | 8/2014 | Soma | H02K 1/2766 310/156.53 |
| 2015/0069874 | A1* | 3/2015 | Iki | H02K 1/274 310/156.11 |
| 2015/0194849 | A1* | 7/2015 | Kayano | H02K 1/276 310/156.53 |
| 2015/0372578 | A1* | 12/2015 | Matsuda | H02K 1/276 310/156.07 |
| 2015/0380996 | A1* | 12/2015 | Kim | H02K 1/2773 310/156.56 |
| 2016/0365762 | A1* | 12/2016 | Liang | H02K 1/2766 |
| 2017/0085143 | A1* | 3/2017 | Tanaka | H02K 29/03 |
| 2017/0104376 | A1* | 4/2017 | Nakagawa | H02K 1/2773 |
| 2017/0279322 | A1* | 9/2017 | Sasaki | G01N 27/82 |
| 2018/0309333 | A1* | 10/2018 | Makino | H02K 1/27 |
| 2019/0058365 | A1* | 2/2019 | Aida | H02K 1/2766 |
| 2019/0089214 | A1* | 3/2019 | Tang | H02K 1/2766 |
| 2021/0184520 | A1* | 6/2021 | Zhang | H02K 1/24 |

FOREIGN PATENT DOCUMENTS

| | | |
|---|---|---|
| JP | 2011-050179 A | 3/2011 |
| JP | 2013-126330 A | 6/2013 |
| JP | 2015-053757 A | 3/2015 |
| JP | 2019-170128 A | 10/2019 |
| JP | 2020-156192 A | 9/2020 |
| WO | 2008/153171 A1 | 12/2008 |

* cited by examiner

ROTOR WITH MAGNET AND EMBEDDING HOLES

CROSS REFERENCE TO RELATED APPLICATIONS

This is a national phase application of PCT/JP2022/005829 filed Feb. 15, 2022, claiming priority to Japanese Patent Application No. JP2021-022727 filed Feb. 16, 2021, the contents of which are incorporated herein by reference.

TECHNICAL FIELD

The present disclosure relates to a rotor, more particularly, to a rotor with a rotor core and a plurality of permanent magnets.

BACKGROUND

A conventionally known rotor includes a rotor core (rotor body) and a plurality of permanent magnets (as shown in, for example, Patent Literature 1). The plurality of permanent magnets is embedded in a plurality of slots (insertion holes) formed in the rotor core and form a plurality of magnetic poles. The rotor includes grooves (recesses). The grooves are formed on an outer circumferential surface of the rotor core at a position between the magnetic poles and the depth from the outer circumferential surface of the grooves is deeper than the minimum depth from the outer circumferential surface of the slots. This suppresses iron loss.

CITATION LIST

Patent Literature

PTL1: Japanese Patent Application Laid Open No. 2020-156192

SUMMARY

However, in the rotor described above, the position between the magnetic poles corresponds to the position of the q-axis when the motor using this rotor is operated, and the inventors found that if a groove is provided at the position between the magnetic poles, the average torque of the motor (the average instantaneous torque over a given time when the motor is controlled at maximum torque at the rated current) may decrease. In addition, since the depth of the grooves from the outer circumferential surface of the grooves is deeper than the minimum depth of the slots from the outer circumferential surface of the slots, the strength of the rotor core may be reduced by the provision of such grooves.

A main object of a rotor of the present disclosure is to suppress reduction in average torque of a motor and reduction in strength of a rotor core.

The rotor of the present disclosure employs the following configuration in order to achieve the above main object.

The present disclosure is directed to a rotor used for a motor. The rotor includes a rotor core, and a plurality of permanent magnets embedded in a corresponding plurality of embedding holes in the rotor core that includes flux barriers at both ends of the plurality of embedding holes in the rotor core and to include a plurality of magnetic poles. The rotor core includes a plurality of grooves on an outer peripheral surface. The plurality of grooves, with the two paired grooves, are away from an axis that becomes the q-axis when the motor is operated, and are arranged symmetrically about the axis. The rotor core has such a cross-section that a first angle between two lines passing through the two paired grooves and the center of the rotor core is smaller than a second angle between the axis-side end face of the two flux barriers adjacent to each other across the axis.

In the rotor according to this aspect of the present disclosure, the rotor core includes a plurality of grooves on an outer peripheral surface. The plurality of grooves, with the two paired grooves, are away from an axis that becomes the q-axis when the motor is operated, and are arranged symmetrically about the axis. This prevents a decrease in average torque of the motor (average value of the instantaneous torque over a given time when the motor is controlled at maximum torque at rated current). The rotor core has such a cross-section that a first angle between two lines passing through the two paired grooves and the center of the rotor core is smaller than a second angle between the axis-side end face of the two flux barriers adjacent to each other across the axis. This prevents a reduction in strength of the rotor core. As a result, the rotor of this aspect suppresses the reduction in the average torque of the motor and the reduction in the strength of the rotor core.

The plurality of grooves may include a tip at one of the circumferential ends of the rotor core that is farther from the axis, and the tip may be located closer to the axis than the location where the depth from the outer peripheral surface of the rotor core to the embedding hole closest to the tip is the minimum.

The depth of the plurality of grooves from the outer peripheral surface of the rotor core may be shallower than the minimum depth from the outer peripheral surface to the embedding hole. The rotor enables to further suppress the reduction in the strength of the rotor core.

Two paired embedding holes of the plurality of embedding holes may be formed in the rotor core to form an abbreviated V-shape that are getting farther apart from each other as going apart from a center side of the rotor core and as going closer to an outer circumferential side. The plurality of permanent magnets may be embedded in the embedding holes such that two paired permanent magnets embedded in two paired embedding holes form one magnetic pole.

The disclosure is further directed to a motor includes a stator formed in a cylindrical shape and including a plurality of teeth that project inwardly in the radial direction at circumferential intervals on an inner peripheral surface, and a rotor of any of the present disclosures described above and rotatably arranged in the stator through an air gap. The rotor basically includes a rotor core, and a plurality of permanent magnets embedded in a corresponding plurality of embedding holes in the rotor core that includes flux barriers at both ends of the plurality of embedding holes in the rotor core and to form a plurality of magnetic poles. The rotor core includes a plurality of grooves on an outer peripheral surface. The plurality of grooves, with the two paired grooves, are away from an axis that becomes the q-axis when the motor is operated, and are arranged symmetrically about the axis. The rotor core has such a cross-section that a first angle between two lines passing through the two paired grooves and the center of the rotor core is smaller than a second angle between the axis-side end face of the two flux barriers adjacent to each other across the axis. The plurality of grooves is formed such that the first angle is the same as the angle formed by the two circumferential outer faces of the teeth.

The motor of the present disclosure includes the rotor of the present disclosure in any of the above-described forms.

The motor achieves the effects that the rotor of the present disclosure achieves, for example, the effects of suppressing the reduction in the average torque of the motor and the reduction in the strength of the rotor core. The plurality of grooves is formed such that the first angle and the angle formed by the two circumferential outer faces of the teeth are the same. This configuration makes stator flux change that is based on difference between magnetic resistance when the teeth face the q-axis and magnetic resistance when the teeth do not face the q-axis (when the slots between the teeth face the q-axis) during the rotation of the rotor sinusoidal and reduces a torque ripple.

DESCRIPTION OF EMBODIMENTS

The following describes some aspects of the disclosure with reference to embodiments.

Figure 1:
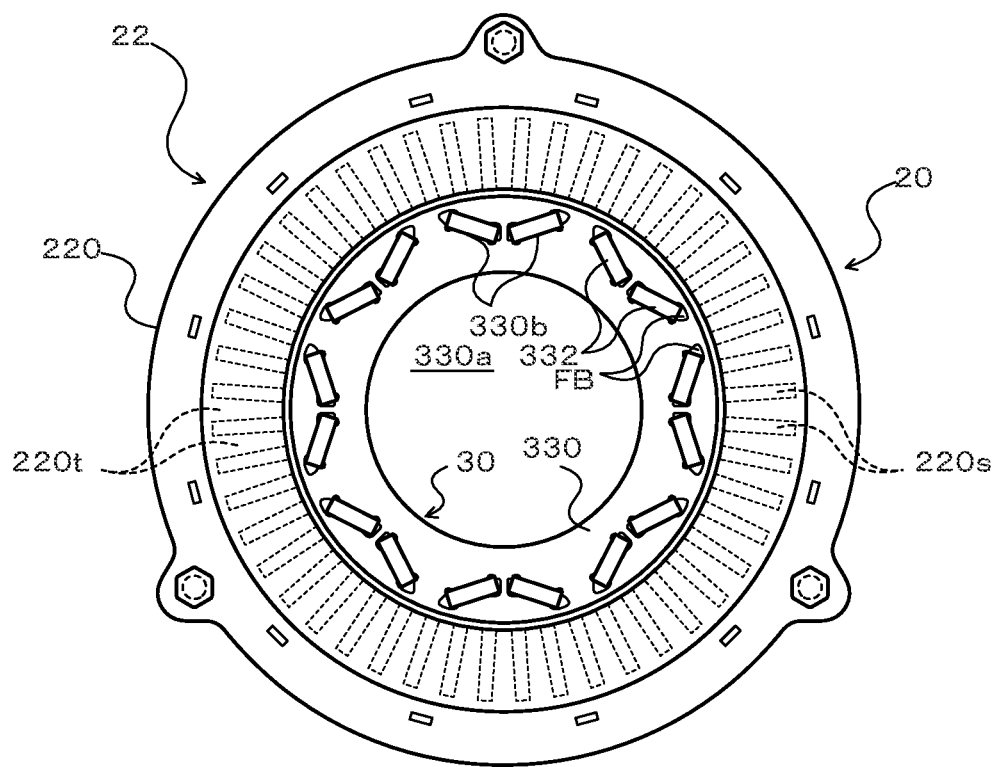
FIG. 1 is a schematic configuration diagram illustrating a motor 20 that includes a rotor according to the disclosure.
Figure 2:
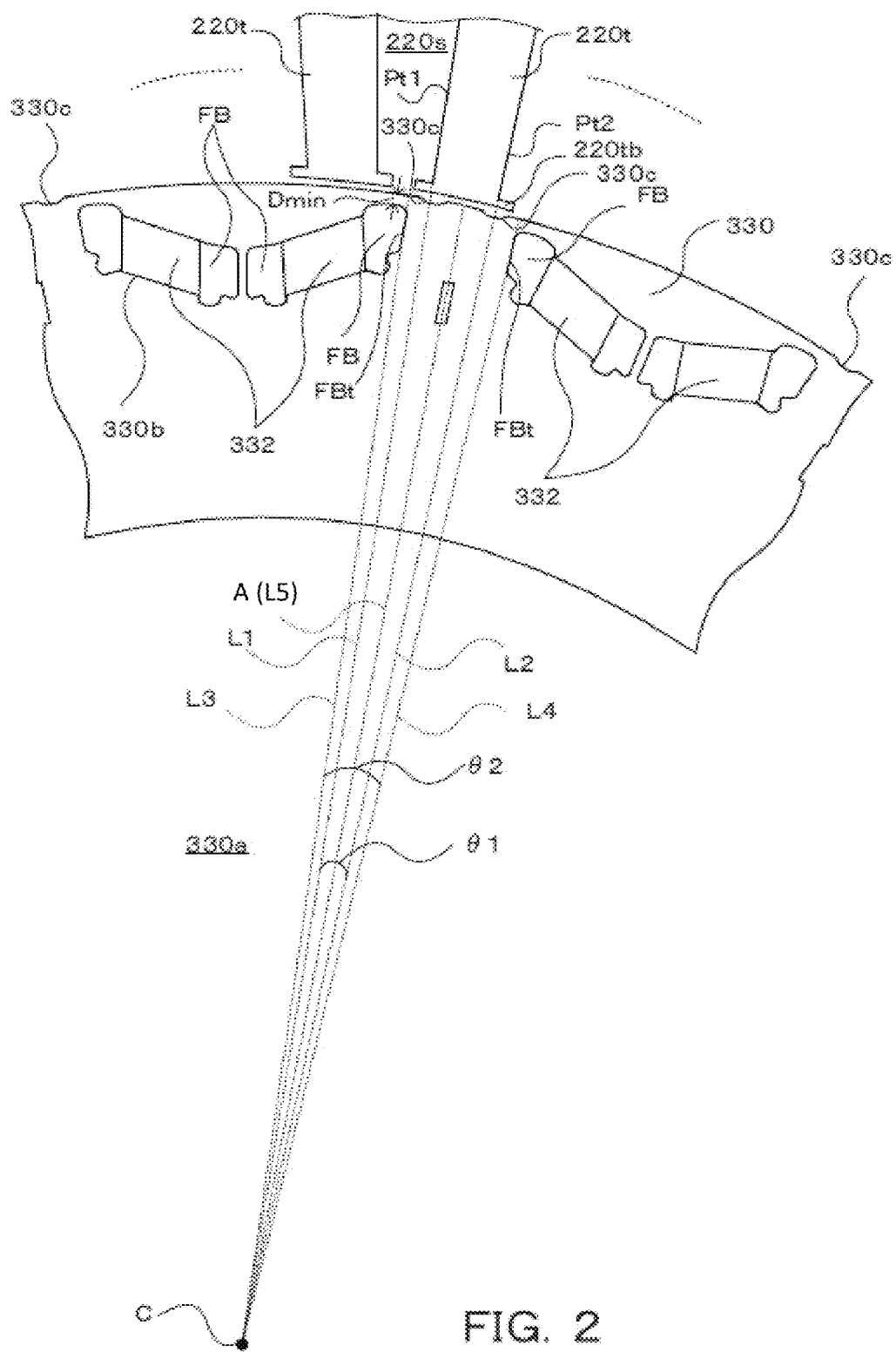
FIG. 2 is a schematic diagram illustrating an enlarged cross-sectional view of a main section of the motor 20.
Figure 3:
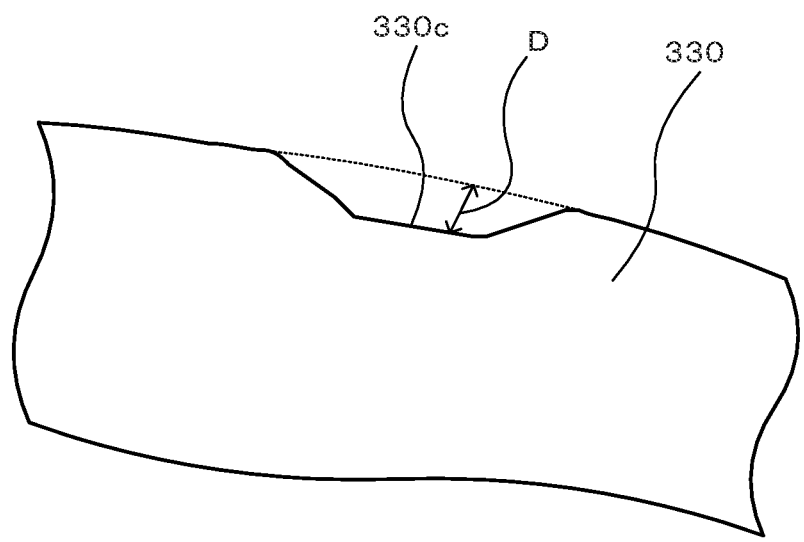
FIG. 3 is a schematic diagram illustrating an enlarged cross-sectional view of groove 330c.
Figure 4:
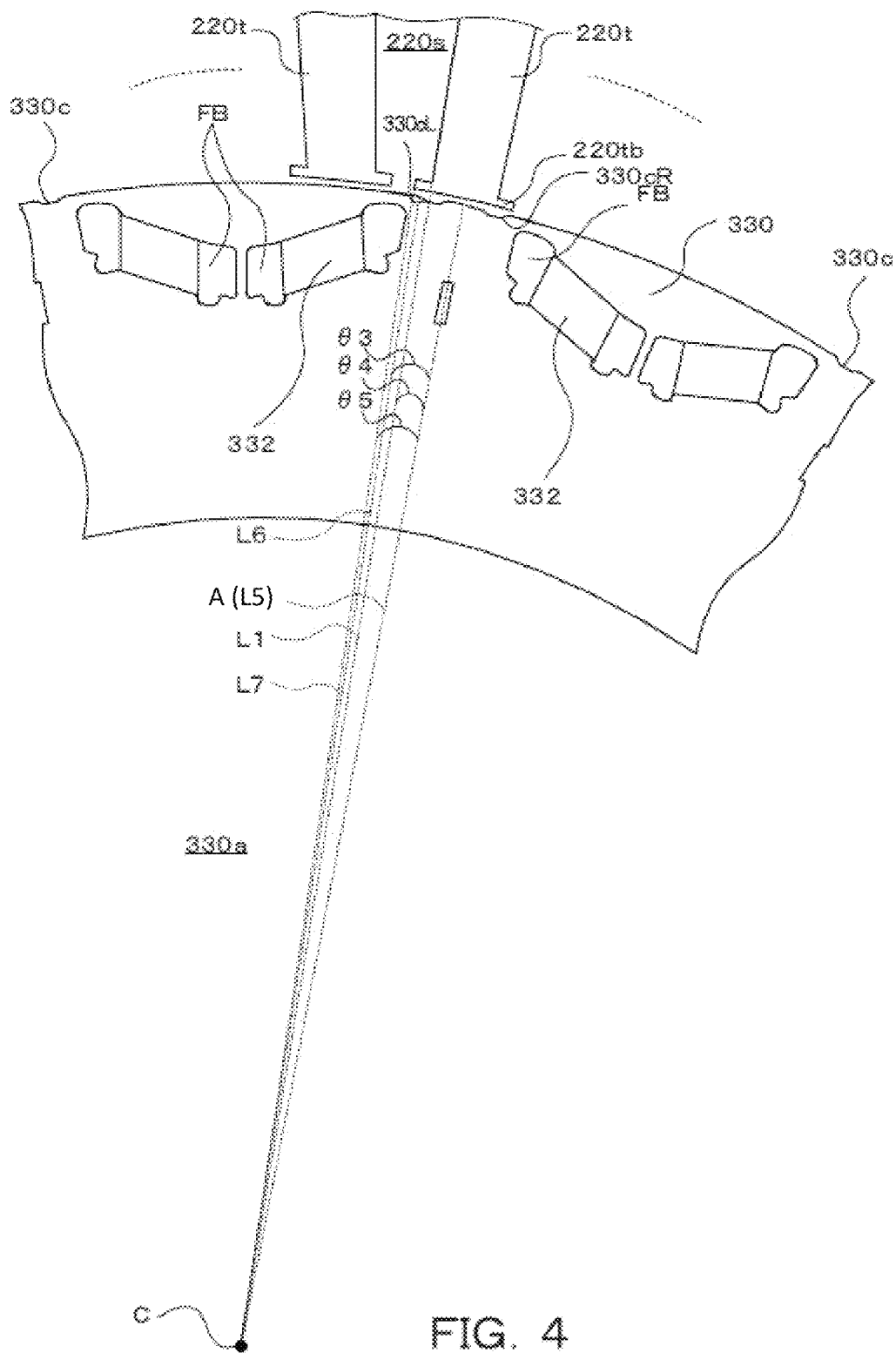
FIG. 4 is an explanatory diagram illustrating an angles θ3 to θ5.

FIG. 1 is a schematic configuration diagram illustrating a motor 20 that includes a rotor according to the disclosure. FIG. 2 is a schematic diagram illustrating an enlarged cross-sectional view of a main section of the motor 20. FIG. 3 is a schematic diagram illustrating an enlarged cross-sectional view of groove 330c. FIG. 4 is an explanatory diagram illustrating an angles θ3 to θ5. The motor 20 is a 3-phase AC electric motor used, for example, as a running drive source or generator for battery electric vehicles and hybrid vehicles. The motor 20 includes a stator 22 and a rotor 30, as illustrated.

The stator 22 includes a stator core 220 and a plurality of coils (not illustrated), as shown in FIG. 1. The stator core 220 is formed, for example, by stacking a plurality of electromagnetic steel plates formed into a circular shape by press working. The stator core 220 is entirely cylindrical. The stator core 220 includes a plurality of teeth 220t that project inwardly in the radial direction at circumferential intervals from the outer circumference (yoke) and include a circumferentially wide brim 220tb formed at the tip, and a plurality of slots 220s that are formed between mutually adjacent the teeth 220t, respectively. An insulator (insulating paper), not shown, is placed in each slot 220s.

The rotor 30 is freely rotatable inside the stator 22 through an air gap and, as shown in FIGS. 1 and 2, includes a rotor core 330 and a plurality of permanent magnets 332 (in the rotor 30 of the embodiment, for example, 16 permanent magnets 332).

The rotor core 330 is fixed to a rotating shaft, which is not shown in the figure, and is formed by stacking a plurality of core plates formed in an annular shape by electromagnetic steel sheets or the like. As shown in FIGS. 1 and 2, the rotor core 330 includes a center hole 330a into which the rotating shaft described above is inserted and fixed, a plurality of magnet embedding holes 330b (in the rotor core 330 of the embodiment, for example, 16 magnet embedding holes 330b), a plurality of grooves 330c (in the rotor core 330 of the embodiment, 16 grooves 330c). The plurality of grooves 330c are described below.

The plurality of magnet embedding holes 330b are arranged in pairs in the rotor core 330 at predetermined intervals (45° intervals in embodiment) such that each magnet embedding holes 330b passes through the rotor core 330 in the axial direction. The two paired magnet embedding holes 330b are formed such that the two paired magnet embedding holes 330b are getting farther apart from each other as going apart from an axial center side of the rotor 30 and as going closer to an outer circumferential side (such that the two paired magnet embedding holes 330b form an abbreviated V-shape). Each magnet embedding hole 330b has a width longer than a width of the permanent magnet 332. When the permanent magnets 332 are placed in the magnet embedding holes 330b, flux barriers FB are formed on both sides of each permanent magnet 332 in the width direction as void areas to suppress a short circuit of the magnetic flux from the permanent magnet 332.

The permanent magnet 332 is, for example, rare earth sintered magnet such as neodymium magnet, and is formed in an abbreviated rectangular shape. The two paired permanent magnets 332 are inserted and fixed in the corresponding the magnet embedding holes 330b such that poles located on the outer circumference side of the rotor 30 are identical to each other. As a result, the two paired permanent magnets 332 are arranged in the rotor core 330 such that the two paired permanent magnets 332 are getting farther apart from each other as going apart from the axial center side of the rotor 30 and as going closer to the outer circumferential side, and form one magnetic pole of the rotor 30.

The rotor 30 of the motor 20 thus configured rotates by supplying AC current to each coil from an inverter, not shown, controlled by PWM.

The plurality of grooves 330c are explained here. The plurality of grooves 330c are formed to extend axially on an outer peripheral surface of the rotor core 330, respectively, as shown in FIG. 2. The plurality of grooves 330c, with the two grooves 330c in pairs, are away from a corresponding axis A among a plurality (in the embodiment, eight) of axes A that become q-axes when the motor 20 is operated, and are arranged symmetrically about the axis A. This prevents a decrease in average torque of the motor 20 (average value of the instantaneous torque over a given time when the motor 20 is controlled at maximum torque at rated current).

In the plurality of grooves 330c, as shown in FIG. 2, the first angle θ1 is smaller than the second angle θ2 in a section perpendicular to axis of rotation of the rotor core 330. The first angle θ1 is formed by two straight lines L1 and L2 passing through the two paired grooves 330c and a center C of the rotor core 330. The second angle θ2 is formed by two straight lines L3 and L4 parallel to the end faces FBt of the axis A side of two flux barriers FB adjacent to each other with the axis A. That is, the second angle θ2 is the angle between two straight lines L3 and L4 parallel to the end faces FBt on the axis A side of the two flux barriers FB adjacent to each other across the axis A. The two paired grooves 330c are formed on the side of the axis A from the flux barriers FB adjacent to each other across the axis A. The two straight lines L1 and L2 can be straight lines passing through any position of the two paired grooves 330c. Furthermore, the plurality of grooves 330c are formed such that the depth D at the deepest point from the outer peripheral surface of the rotor core 330 is shallower than the minimum depth Dmin from the outer peripheral surface to the nearest magnet embedding hole 330b, as shown in FIGS. 2 and 3. Forming the two paired grooves 330c on the flux barrier FB adjacent to each other across the axis A or outside the flux barrier FB reduces strength of the rotor core 330 because thickness of the rotor core 330 at top of the flux barrier FB is thinner than the rest of the rotor core 330. Forming the plurality of grooves 330c deeply reduces the strength of the rotor core 330 compared to forming the plurality of grooves 330c shallowly, because the rotor core 330 becomes thinner at the points where the grooves 330c are formed. In the embodiment, forming the plurality of grooves 330c as described above can suppress the reduction in strength of the rotor core 330.

The plurality of grooves 330c are formed such that the first angle θ1 and angle formed by two circumferential outer faces Pt1 and Pt2 of the teeth 220t are equal when a straight line L5 passing through the center of the teeth 220t and the center C overlaps the axis A, as shown in FIG. 2. This is to make stator magnetic flux change sinusoidal due to the difference between magnetic resistance when the teeth 220t face the q-axis and magnetic resistance when the teeth 220t do not face the q-axis (when the slots 220s face the q-axis) during rotation of the rotor 30. This reduces a torque ripple.

In the plurality of groove portions 330cL to the left of the axis A in FIG. 4, as shown in FIG. 4, an angle θ3 is larger than an angle θ4 (=(θ1)/2) and less than or equal to an angle θ5. The angle θ3 is an angle between a straight line L6 passing through the tip of the circumferential ends of the rotor core 330 that are farther from the axis A and the center C, and the straight line L5 (the axis A). The angle θ4 is an angle between the straight line (the straight line L1) passing through the root of the brim 220tb and the center C, and the straight line L5 (the axis A). The angle θ5 is the angle between a straight line L7 passing through a tip of the brim 220tb and the center C, and the straight line L5. That is, in the cross section of FIG. 4, the groove 330cL is formed such that at least a part of the groove 330cL is within the range enclosed by the straight lines L1 and L7. A groove 330cR on right side from the axis A in FIG. 4 of the plurality of grooves 330c is formed in the same way as groove 330cL. This reduces a torque ripple caused by the slots 220s.

As has been described above, the motor 20 includes the rotor core of the disclosure is configured to include the plurality of grooves 330c on the outer peripheral surface. The plurality of grooves 330c, with the two paired grooves 330c, are away from the axis A that becomes the q-axis when the motor 20 is operated, and are arranged symmetrically about the axis A. The rotor core 330 include such a cross-section that the first angle θ1 between the two straight lines L1 and L2 passing through the two paired grooves 330c and the center C of the rotor core 330 is smaller than the second angle θ2 between the axis A side end face of the two flux barriers FB adjacent to each other across the axis A. This suppresses the reduction in the average torque of the motor 20 and the reduction in the strength of the rotor core 330.

In the motor 20 including the rotor of the above embodiment, the plurality of grooves 330c are formed such that the depth D from the outer circumference of the rotor core 330 is shallower than the minimum depth Dmin from the outer circumference to the nearest magnet embedding hole 330b. However, the depth D may be the same depth as the minimum depth Dmin, or the depth D may be deeper than the minimum depth Dmin.

In the motor 20 including the rotor of the above embodiment, the circumferentially wide brim 220tb is formed at the tip of the plurality of teeth 220t. However, the plurality of teeth 220t may be formed to taper in the radial direction or to have a constant circumferential width in the radial direction without forming the brim 220tb on the plurality of teeth 220t. In this case, the groove portion 330cL of the plurality of grooves 330c may be formed such that when the straight line L5 overlaps the axis A, the angle θ3 between the straight line L6 and the straight line L5 (the axis A) is greater than the angle θ4 and less than or equal to the angle θ6 (=(θ2)/2) between the straight line L3 and the straight line L5 (the axis A), that is, at least a portion of the groove 330cL may be formed such that it is within the range bounded by the straight line L1 and the straight line L3 (or the straight line L4). The grooves 330cR of the plurality of grooves 330c, may be formed in the same way as the groove 330cL.

The following describes the correspondence relationship between the primary elements of the above embodiment and the primary elements of the disclosure described in Summary. In the embodiment, the rotor core 330 corresponds to the "rotor core," the permanent magnet 332 corresponds to the "permanent magnet," and the groove 330c corresponds to the "groove".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is applicable to the manufacturing industries of the rotor and so on.

The invention claimed is:

1. A rotor used for a motor, comprising:
  a rotor core; and
  a plurality of permanent magnets embedded in a corresponding plurality of embedding holes in the rotor core configured to include flux barriers at both ends of the plurality of embedding holes in the rotor core and to include a plurality of magnetic poles, wherein
  the rotor core includes a plurality of grooves on an outer peripheral surface,
  the plurality of grooves, with the two paired grooves, are away from an axis that becomes the q-axis when the motor is operated, and are arranged symmetrically about the axis,
  the rotor core has such a cross-section that a first angle θ1 between two lines, a straight line L1 and a straight line L2, passing through the two grooves and the center of the rotor core is smaller than a second angle θ2 between an axis-side end face of the two flux barriers adjacent to each other across the axis,
  the rotor is arranged in a stator core of a stator, and the stator core comprises a plurality of teeth that are projected inwardly in a radial direction from an outer circumference of the stator to an inside of the stator at circumferential intervals along the outer peripheral surface of the rotor core,
  one of the plurality of teeth comprises a circumferentially wide brim extended circumferentially from roots arranged at a tip of the one of the plurality of teeth, the tip is facing the rotor core, and the straight line L1 is passing through one of the roots, the one of the plurality of teeth further comprises circumferential outer faces extended from the roots and radially away from the tip of the one of the plurality of teeth, an angle, formed between the circumferential outer faces of the one of the plurality of teeth with the center of the rotor core as a vertex of the angle, is equal to and overlaps the first angle θ1 as a straight line L5 is both passing through the center of the rotor core and a center of the one of the plurality of teeth and is aligned with the axis, a fourth angle θ4, between the straight line L1 and the straight line L5 with the center of the rotor core being a fourth angle θ4 vertex of the fourth angle θ4, is equal to half of the first angle θ1, a straight line L7 is passing from the center to a circumferentially outermost tip of the circumferentially wide brim of the one of the plurality of teeth, a fifth angle θ5 is between the straight line L7 and the straight line L5 with the center of the rotor core as a fifth angle θ5 vertex of the fifth angle θ5, a straight line L6 is passing through the center of the rotor core and a tip of a circumferential end of one of the two grooves, the straight line L6 is also passing from the center of the rotor core, through the tip of the circumferential end of one of the two grooves, and along one of the circumferential outer faces of the one of the plurality of teeth, and a third angle θ3, between the straight line L5 and the straight line L6, is both greater than the fourth angle θ4 and less than or equal to the fifth angle θ5.

2. The rotor according to claim 1, wherein the depth of the plurality of grooves from the outer peripheral surface of the rotor core is shallower than the minimum depth from the outer peripheral surface to the embedding hole.

3. The rotor according to claim 1, wherein the plurality of grooves includes a groove tip at one of the circumferential ends of the rotor core that is farther from the axis, and wherein the groove tip is located closer to the axis than the location where the depth from the outer peripheral surface of the rotor core to the embedding hole closest to the groove tip is the minimum.

4. The rotor according to claim 3, wherein the depth of the plurality of grooves from the outer peripheral surface of the rotor core is shallower than the minimum depth from the outer peripheral surface to the embedding hole.

5. The rotor according to claim 1, wherein a straight line L3 is passing through the center of the rotor core and one of the two flux barriers, a sixth angle θ6, between the straight line L3 and the straight line L5 and with the center of the rotor core being a sixth angle θ6 vertex of the sixth angle θ6, is equal to half of the second angle θ2 a third angle θ3, between the straight line L5 and the straight line L6, is both greater than the fourth angle θ4 and less than or equal to the sixth angle θ6.

6. The rotor according to claim 5, wherein a third angle θ3, between the straight line L5 and the straight line L6, is both greater than the fourth angle θ4 and less than or equal to the sixth angle θ6.

* * * * *